United States Patent
Dal Pra'

(10) Patent No.: US 10,308,309 B2
(45) Date of Patent: Jun. 4, 2019

(54) CONTROL DEVICE FOR A BICYCLE AND BICYCLE COMPRISING SUCH A DEVICE

(71) Applicant: CAMPAGNOLO S.R.L., Vicenza (IT)

(72) Inventor: Giuseppe Dal Pra', Zane (IT)

(73) Assignee: CAMPAGNOLO S.R.L., Vicenza (IT)

( * ) Notice: Subject to any disclaimer, the term of this patent is extended or adjusted under 35 U.S.C. 154(b) by 463 days.

(21) Appl. No.: 14/707,832

(22) Filed: May 8, 2015

(65) Prior Publication Data
US 2015/0246708 A1 Sep. 3, 2015

Related U.S. Application Data

(62) Division of application No. 12/039,810, filed on Feb. 29, 2008, now Pat. No. 9,027,433.

(30) Foreign Application Priority Data

Mar. 1, 2007 (IT) .............................. MI2007A0400

(51) Int. Cl.
*B62L 3/02* (2006.01)
*G05G 1/06* (2006.01)
*B62K 23/06* (2006.01)

(52) U.S. Cl.
CPC ................ *B62K 23/06* (2013.01); *B62L 3/02* (2013.01); *G05G 1/06* (2013.01); *Y10T 74/206* (2015.01); *Y10T 74/20438* (2015.01)

(58) Field of Classification Search
CPC .......... B62M 25/04; B62K 23/06; B62L 3/02; G05G 1/06
See application file for complete search history.

(56) References Cited

U.S. PATENT DOCUMENTS

| | | | |
|---|---|---|---|
| 1,706,542 A | 3/1929 | Pugh et al. |
| 2,384,728 A | 9/1945 | Crumble |
| 2,466,363 A | 4/1949 | Bodinaux |
| 2,586,604 A | 2/1952 | Bennett |
| 2,770,980 A | 11/1956 | Millward |
| 2,854,857 A | 10/1958 | Gleasman et al. |
| 3,279,779 A | 10/1966 | Thomas et al. |
| 3,760,648 A | 9/1973 | Hoffman |
| 3,776,061 A | 12/1973 | Yoshigai |

(Continued)

FOREIGN PATENT DOCUMENTS

| | | |
|---|---|---|
| CH | 248133 A | 4/1947 |
| CN | 1144761 A | 3/1997 |

(Continued)

OTHER PUBLICATIONS define palm rest—Google Search, google.com., Jul. 16, 2017.*

(Continued)

*Primary Examiner* — Vinh Luong
(74) *Attorney, Agent, or Firm* — Volpe and Koenig, P.C.

(57) ABSTRACT

A control device for a bicycle, has a first body adapted to be attached to a bicycle handlebar, at least one control member of at least one bicycle component, and a second body, distinct from the first body, connected to the first body to increase a grip surface of the control device and/or to vary the relative position of the at least one control member with respect to the handlebar of the bicycle, so as to adapt the control device to the size of the cyclist's hand.

27 Claims, 17 Drawing Sheets

(56) References Cited

U.S. PATENT DOCUMENTS

| | | | |
|---|---|---|---|
| 3,802,200 A * | 4/1974 | Kolm | B62L 3/023 60/588 |
| 3,875,818 A * | 4/1975 | Yoshigai | B62L 3/02 74/480 R |
| 3,915,029 A | 10/1975 | Shimada | |
| 3,972,247 A | 8/1976 | Armstrong | |
| 4,002,350 A | 1/1977 | Timbs | |
| 4,075,871 A | 2/1978 | Burke | |
| 4,100,820 A | 7/1978 | Evett | |
| 4,132,296 A | 1/1979 | Evett | |
| 4,245,522 A | 1/1981 | Robinson | |
| 4,319,673 A | 3/1982 | Kojima | |
| 4,454,784 A | 6/1984 | Shimano | |
| 4,459,871 A | 7/1984 | Shimano | |
| 4,605,240 A | 8/1986 | Clem et al. | |
| 4,740,001 A | 4/1988 | Torleumke | |
| D298,309 S | 11/1988 | Coue | |
| 4,840,084 A | 6/1989 | Terashima et al. | |
| 4,885,951 A | 12/1989 | Desenclos et al. | |
| 4,930,368 A | 6/1990 | Nagano | |
| 4,945,785 A | 8/1990 | Romano | |
| 4,966,046 A | 10/1990 | Tagawa | |
| RE33,578 E * | 4/1991 | Bass | B60T 11/165 188/344 |
| 5,012,692 A | 5/1991 | Nagano | |
| 5,020,387 A | 6/1991 | Nagano | |
| 5,050,444 A | 9/1991 | Nishimura | |
| 5,094,120 A | 3/1992 | Tagawa | |
| RE34,007 E | 7/1992 | Desenclos et al. | |
| 5,159,851 A | 11/1992 | Rahmes | |
| 5,186,071 A | 2/1993 | Iwasaki | |
| 5,203,213 A | 4/1993 | Nagano | |
| 5,213,005 A | 5/1993 | Nagano | |
| 5,222,412 A | 6/1993 | Nagano | |
| 5,241,878 A | 9/1993 | Nagano | |
| 5,257,683 A | 11/1993 | Romano | |
| 5,279,179 A | 1/1994 | Yoshigai | |
| 5,287,765 A | 2/1994 | Scura | |
| 5,303,608 A | 4/1994 | Iwasaki | |
| 5,400,675 A | 3/1995 | Nagano | |
| 5,479,776 A | 1/1996 | Romano | |
| 5,480,356 A | 1/1996 | Campagnolo | |
| 5,515,743 A | 5/1996 | Lumpkin | |
| 5,528,954 A | 6/1996 | Yoshigai | |
| 5,575,178 A | 11/1996 | Wu | |
| 5,588,925 A | 12/1996 | Arbeiter et al. | |
| 5,601,001 A | 2/1997 | Kawakami et al. | |
| 5,676,020 A | 10/1997 | Jordan et al. | |
| 5,676,021 A | 10/1997 | Campagnolo | |
| 5,676,022 A | 10/1997 | Ose | |
| 5,755,139 A | 5/1998 | Kojima | |
| 5,787,757 A | 8/1998 | Ozaki | |
| 5,791,195 A | 8/1998 | Campagnolo | |
| 5,806,372 A | 9/1998 | Campagnolo | |
| 5,832,782 A | 11/1998 | Kawakami | |
| 5,896,779 A | 4/1999 | Biersteker et al. | |
| 5,900,705 A | 5/1999 | Kimura | |
| 5,921,140 A | 7/1999 | Lemmens | |
| 5,954,161 A | 9/1999 | Lee | |
| 5,970,816 A | 10/1999 | Savard | |
| 6,073,730 A | 6/2000 | Abe | |
| 6,095,010 A | 8/2000 | Arbeiter et al. | |
| 6,098,487 A | 8/2000 | Chein | |
| 6,098,488 A | 8/2000 | Vos | |
| 6,112,614 A | 9/2000 | Yamashita | |
| 6,161,448 A | 12/2000 | Wang | |
| 6,370,981 B2 | 4/2002 | Watarai | |
| 6,450,060 B1 | 9/2002 | Shahana | |
| 6,457,377 B1 | 10/2002 | Hsu | |
| 6,457,378 B2 | 10/2002 | Hatakoshi | |
| 6,502,477 B1 | 1/2003 | Assel | |
| 6,546,827 B2 | 4/2003 | Irie | |
| 6,553,861 B2 | 4/2003 | Ose | |
| 6,564,670 B2 | 5/2003 | Feng et al. | |
| 6,564,671 B2 | 5/2003 | Ose | |
| 6,647,823 B2 | 11/2003 | Tsumiyama et al. | |
| 6,647,825 B1 | 11/2003 | Lin | |
| 6,792,826 B2 | 9/2004 | Dal Pra' | |
| 6,957,597 B2 | 10/2005 | Irie et al. | |
| 7,100,471 B2 | 9/2006 | Irie et al. | |
| 8,161,840 B2 | 4/2012 | Nago | |
| 8,201,670 B2 * | 6/2012 | Tetsuka | B62L 3/023 188/24.22 |
| 8,459,142 B2 | 6/2013 | Orrico et al. | |
| 9,233,730 B2 * | 1/2016 | Kariyama | B62L 3/023 |
| 9,821,871 B2 | 1/2017 | Feuerstein | |
| 2002/0078789 A1 | 6/2002 | Chen | |
| 2002/0104401 A1 | 8/2002 | Dal Pra' | |
| 2002/0124679 A1 | 9/2002 | Dal Pra' | |
| 2002/0139637 A1 | 10/2002 | Tsumiyama et al. | |
| 2003/0066377 A1 | 4/2003 | Spaizar | |
| 2003/0094064 A1 | 5/2003 | Dal Pra' | |
| 2003/0167871 A1 | 9/2003 | Irie et al. | |
| 2003/0177855 A1 | 9/2003 | Tsumiyama et al. | |
| 2004/0144193 A1 | 7/2004 | Sato et al. | |
| 2004/0163486 A1 | 8/2004 | Irie et al. | |
| 2004/0237697 A1 | 12/2004 | Kawakami | |
| 2004/0237698 A1 | 12/2004 | Hilsky et al. | |
| 2005/0097979 A1 * | 5/2005 | Nago | B60T 11/046 74/502.2 |
| 2005/0199450 A1 | 9/2005 | Campbell et al. | |
| 2005/0241428 A1 | 11/2005 | Tsai | |
| 2006/0070480 A1 | 4/2006 | Fujii | |
| 2006/0207375 A1 | 9/2006 | Jordan et al. | |
| 2006/0272443 A1 | 12/2006 | Tsumiyama | |
| 2007/0034037 A1 | 2/2007 | Dal Pra' et al. | |
| 2007/0068332 A1 | 3/2007 | Fujii et al. | |
| 2007/0137361 A1 | 6/2007 | Fujii | |
| 2007/0137388 A1 | 6/2007 | Dal Pra' | |
| 2007/0137391 A1 | 6/2007 | Fujii | |
| 2007/0178715 A1 | 8/2007 | Fujii | |
| 2007/0186715 A1 | 8/2007 | Dal Pra' | |
| 2007/0193386 A1 | 8/2007 | Fujii | |
| 2007/0193387 A1 | 8/2007 | Nakano | |
| 2007/0199401 A1 | 8/2007 | Kawakami et al. | |
| 2007/0204716 A1 | 9/2007 | Dal Pra' | |
| 2008/0098848 A1 | 5/2008 | Dal Pra' et al. | |
| 2008/0196537 A1 | 8/2008 | Dal Pra' | |
| 2008/0210041 A1 | 9/2008 | Dal Pra' et al. | |
| 2008/0210042 A1 | 9/2008 | Dal Pra' | |
| 2009/0025504 A1 | 1/2009 | Dal Pra' et al. | |
| 2009/0031846 A1 | 2/2009 | Dal Pra' et al. | |
| 2009/0133526 A1 | 5/2009 | Dal Pra' et al. | |
| 2009/0188340 A1 * | 7/2009 | Tetsuka | B62K 23/02 74/473.13 |
| 2010/0083786 A1 | 8/2010 | Miki et al. | |
| 2013/0014607 A1 | 1/2013 | Miki et al. | |
| 2016/0194052 A1 * | 7/2016 | Barnett | B62L 3/023 188/152 |
| 2018/0178877 A1 * | 6/2018 | Marangon | B62L 3/02 |

FOREIGN PATENT DOCUMENTS

| | | | |
|---|---|---|---|
| CN | 2436412 Y | 6/2001 | |
| CN | 1443679 | 9/2003 | |
| CN | 1550405 A | 12/2004 | |
| DE | 3136922 A | 3/1983 | |
| DE | 3706545 A | 9/1988 | |
| DE | 19607640 A1 | 1/1997 | |
| DE | 202006006796 U | 8/2006 | |
| DE | 102005014065 A * | 9/2006 | B62L 3/023 |
| EP | 0361335 A2 | 4/1990 | |
| EP | 0371254 A2 | 6/1990 | |
| EP | 0478901 | 4/1992 | |
| EP | 0504118 A1 | 9/1992 | |
| EP | 0601211 A1 | 6/1994 | |
| EP | 0601221 A1 | 6/1994 | |
| EP | 0635422 A2 | 1/1995 | |
| EP | 0714826 A2 | 6/1996 | |
| EP | 0744334 A2 | 11/1996 | |
| EP | 0785128 A2 | 7/1997 | |
| EP | 0790175 A1 | 8/1997 | |
| EP | 1123861 A2 | 8/2001 | |

(56) References Cited

FOREIGN PATENT DOCUMENTS

| | | | |
|---|---|---|---|
| EP | 1134158 | A2 | 9/2001 |
| EP | 1245482 | A2 | 10/2002 |
| EP | 1245483 | A2 | 10/2002 |
| EP | 1264765 | A1 | 12/2002 |
| EP | 1342655 | A1 | 9/2003 |
| EP | 1440878 | A2 | 7/2004 |
| EP | 1449756 | A1 | 8/2004 |
| EP | 1473220 | A1 | 11/2004 |
| EP | 1481883 | A1 | 12/2004 |
| EP | 1502847 | A1 | 2/2005 |
| EP | 1535829 | A2 | 6/2005 |
| EP | 1564131 | A1 | 8/2005 |
| EP | 1642823 | A2 | 4/2006 |
| EP | 1698550 | A1 | 9/2006 |
| EP | 1739001 | A1 | 1/2007 |
| EP | 1816066 | A1 | 8/2007 |
| EP | 1826111 | A1 | 8/2007 |
| EP | 1964764 | A2 | 9/2008 |
| EP | 2778033 | A1 | 9/2014 |
| FR | 960276 | A | 4/1950 |
| FR | 2777528 | A1 | 10/1999 |
| FR | 2861686 | A1 | 5/2005 |
| GB | 615173 | A | 1/1949 |
| GB | 2012893 | A | 8/1979 |
| JP | 58003987 | | 6/1956 |
| JP | 51060342 | A2 | 5/1976 |
| JP | S57-17893 | | 1/1982 |
| JP | S57-17894 | | 1/1982 |
| JP | 58030884 | A | 2/1983 |
| JP | S58-224879 | A | 12/1983 |
| JP | 60107475 | A2 | 6/1985 |
| JP | 61241287 | A | 10/1986 |
| JP | 62-176097 | U | 11/1987 |
| JP | 64-083489 | | 3/1989 |
| JP | H1-157092 | U | 10/1989 |
| JP | 01-314683 | | 12/1989 |
| JP | 2088384 | A | 3/1990 |
| JP | 2-225191 | A | 9/1990 |
| JP | 03-107391 | U | 5/1991 |
| JP | 03292280 | | 12/1991 |
| JP | 04331689 | A | 11/1992 |
| JP | 05097088 | A | 4/1993 |
| JP | 05082786 | | 11/1993 |
| JP | 05286476 | A | 11/1993 |
| JP | 06016170 | A | 1/1994 |
| JP | 07033063 | A | 2/1995 |
| JP | 07251784 | A | 10/1995 |
| JP | 08328679 | A | 12/1996 |
| JP | 2000-172354 | | 6/2000 |
| JP | 2002-293282 | | 10/2002 |
| JP | 2003-261084 | | 9/2003 |
| TW | 136125 | Y | 6/1990 |
| TW | 510875 | B | 11/2002 |
| TW | 519089 | U | 1/2003 |
| TW | 570013 | Y | 1/2004 |
| TW | 589267 | B | 6/2004 |
| TW | I223636 | B | 11/2004 |
| TW | I249494 | B | 2/2006 |
| WO | 92/18374 | | 10/1992 |
| WO | 1992018374 | A1 | 10/1992 |
| WO | 2003093094 | A2 | 11/2003 |
| WO | 2005044656 | A1 | 5/2005 |

OTHER PUBLICATIONS define wall—Google Search, google.com., Oct. 27, 2017.*
define grip—Google Search, google.com., Oct. 27, 2017.*
define portion—Google Search, google.com., Oct. 26, 2017.*
English Abstract of DE 102005014065 A, Franz, Sep. 28, 2006.*
Office Action issued in corresponding Chinese Application No. 200810082341.2 dated Nov. 30, 2010 consisting of 5 pgs., English translation provided.
English translation of Taiwanese Office Action for Application No. 097107173, dated Oct. 29, 2012, 4 pgs.
Office Action issued in corresponding Japanese Patent Appln. No. 2008-048978 dated Jun. 12, 2012 consisting of 4 pgs., English translation provided.
Office Action issued in corresponding Chinese Patent Appln. No. 200610090826.7 dated Apr. 3, 2009 consisting of 5 pgs., English Translation provided.
Office Action issued in corresponding Chinese Patent Appln. No. 200710005823.3 dated Sep. 25, 2009 consisting of 5 pgs., English Translation provided.
Office Action issued in corresponding Chinese Patent Appln. No. 200810082341.2 dated Nov. 30, 2010 consisting of 5 pgs., English Translation provided.
Search Report issued in corresponding European Patent Appln. No. 05425458.6 dated Nov. 16, 2005 consisting of 7 pgs.
Search Report issued in corresponding European Patent Appln. No. 05017003.4 dated Dec. 20, 2005 consisting of 7 pgs.
Search Report issued in corresponding European Patent Appln. No. 06003694.4 dated Jul. 31, 2006 consisting of 40 pgs.
Search Report issued in corresponding European Patent Appln. No. RS 114832 dated Apr. 16, 2007 consisting of 3 pgs.
Search Report issued in corresponding European Patent Appln. No. RS 115409 dated Jul. 18, 2007 consisting of 3 pgs.
Search Report issued in corresponding European Patent Appln. No. RS 115410 dated Jul. 31, 2007 consisting of 3 pgs.
Search Report issued in corresponding European Patent Appln. No. RS 115682 dated Oct. 30, 2007 consisting of 4 pgs.
Search Report issued in corresponding European Patent Appln. No. 08003760.9 dated Jun. 27, 2008 consisting of 6 pgs.
Search Report issued in corresponding European Patent Appln. No. 08003755.9 dated Jun. 27, 2008 consisting of 6 pgs.
Search Report issued in corresponding European Patent Appln. No. 08022485.0 dated Jul. 2, 2009 consisting of 8 pgs.
Search Report issued in corresponding European Patent Appln. No. 08005438.0 dated Nov. 5, 2010 consisting of 7 pgs.
Office Action issued in corresponding Japanese Patent Appln. No. 2002-332045 dated Dec. 16, 2008 consisting of 3 pgs, English Translation provided.
Office Action issued in corresponding Japanese Patent Appln. No. 2008-550914 dated May 24, 2011 consisting of 3 pgs., English Translation provided.
Office Action issued in corresponding Japanese Patent Appln. No. 2006-176333 dated Aug. 23, 2011 consisting of 2 pgs, English Translation provided.
Search Report issued in corresponding Taiwanese Patent Appln. No. 096101651 dated Oct. 5, 2011 consisting of 1 page, English Translation provided.
Office Action and Search Report issued in corresponding Taiwanese Patent Appln. No. 095121477 dated Nov. 25, 2011 consisting of 9 pgs., English Translation provided.

* cited by examiner

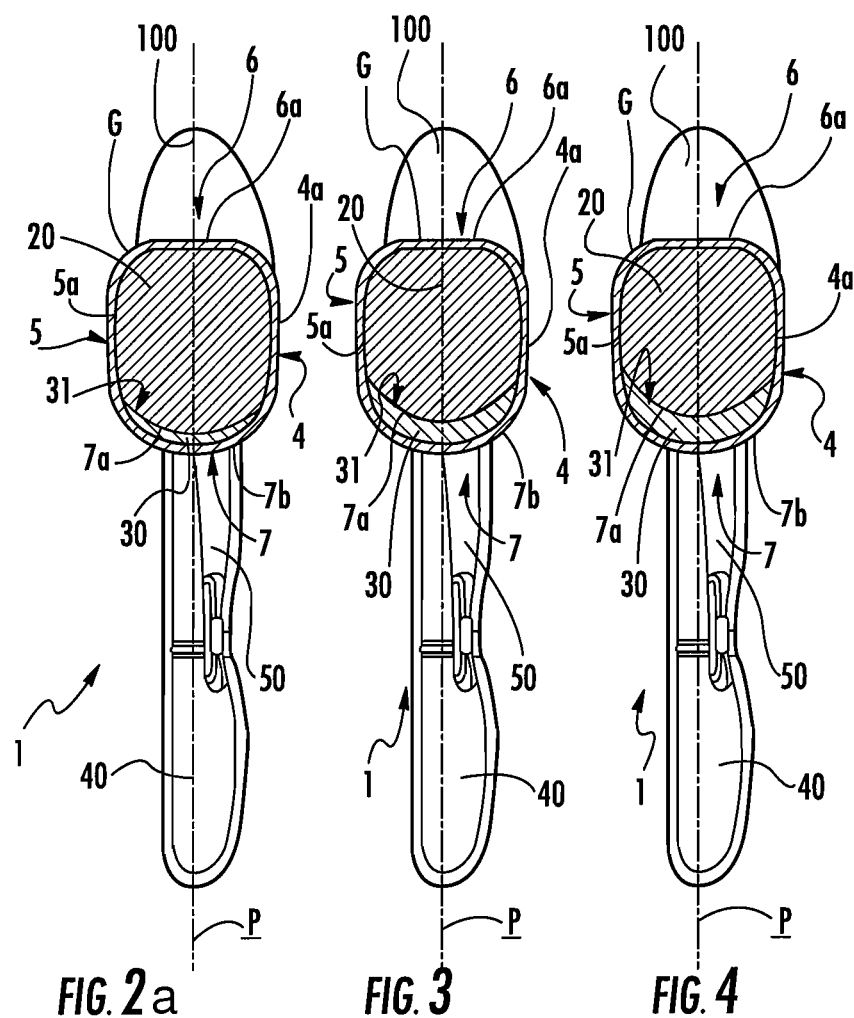

CONTROL DEVICE FOR A BICYCLE AND BICYCLE COMPRISING SUCH A DEVICE

INCORPORATION BY REFERENCE

The present application is a divisional of U.S. patent application Ser. No. 12/039,810, filed Feb. 29, 2008, issued as U.S. Pat. No. 9,027,433 which claimed priority of Italian Patent Application No. MI2007A000400, filed Mar. 1, 2007, the entire contents of all of which are incorporated by reference herein as if fully set forth.

FIELD OF INVENTION

The present invention relates to a control device for a bicycle. In particular, the invention relates to a control device used to ride a bicycle and to actuate/control at least one bicycle component as in, for example, a derailleur (front or rear), a brake (for the front or rear wheel), a servo-assisted gearshift, or a cyclecomputer.

BACKGROUND

Known control devices for racing bicycles are associated with the curved portions of the bicycle handlebar, one on the right and one on the left, to allow the cyclist to grip it to ride the bicycle, as an alternative to the grip on the classical grip provided on the curved portions of the handlebar, and to allow simultaneous actuation/control of one or more components of the bicycle as in, for example, a brake (front or rear), a derailleur (front or rear), and possibly a cyclecomputer.

Known control devices typically comprise a support body mounted on the handlebar of the bicycle so as to project ahead from it and it is shaped so as to make it easier for the cyclist to grip it in particular racing situations. Moreover, in the case in which there is a derailleur actuation lever on the inner side wall of the support body, when the cyclist actuates this lever with his thumb it can knock against the ends of the other fingers. In these circumstances an uncomfortable condition for the cyclist occurs, with a consequent loss of efficiency of the grip.

Moreover, in the case of cyclists with large hands, the space defined on the support body between the derailleur actuation lever arranged behind the brake lever and the handlebar can be very small, with the consequent possibility of accidental contact with the aforementioned lever when the cyclist rides the bicycle gripping the handlebar at the opposite curved end portions thereof. Such an accidental contact is made even more probable by the fact that the cyclist typically wears gloves that increase the bulk of the fingers.

SUMMARY

The control device for a bicycle includes a first body adapted to be associated with a bicycle handlebar. The control device further includes at least one control member of at least one bicycle component, and a second body, distinct from the first body, associated with the first body.

A kit of parts can also be assembled to form a control device for a bicycle. The kit includes a first body adapted to be associated with a bicycle handlebar and is provided with at least one control member of at least one bicycle component. The kit further includes at least two second bodies adapted to be selectively associated with the first body, wherein the at least two second bodies differ in at least one of shape and size.

BRIEF DESCRIPTION OF THE DRAWINGS

Further characteristics and advantages of the control device shall become clearer from the following detailed description of some preferred embodiments thereof, made with reference to the attached drawings. In these drawings:

FIG. 2a is a sectional view along the plane A of FIG. 2;
FIGS. 3 and 4 are sectional views of two alternative embodiments of the control device;
FIG. 16b is a top view of the element of FIG. 16a.

DETAILED DESCRIPTION OF THE PREFERRED EMBODIMENT(S)

Introduction to the Embodiments

Figure 1:
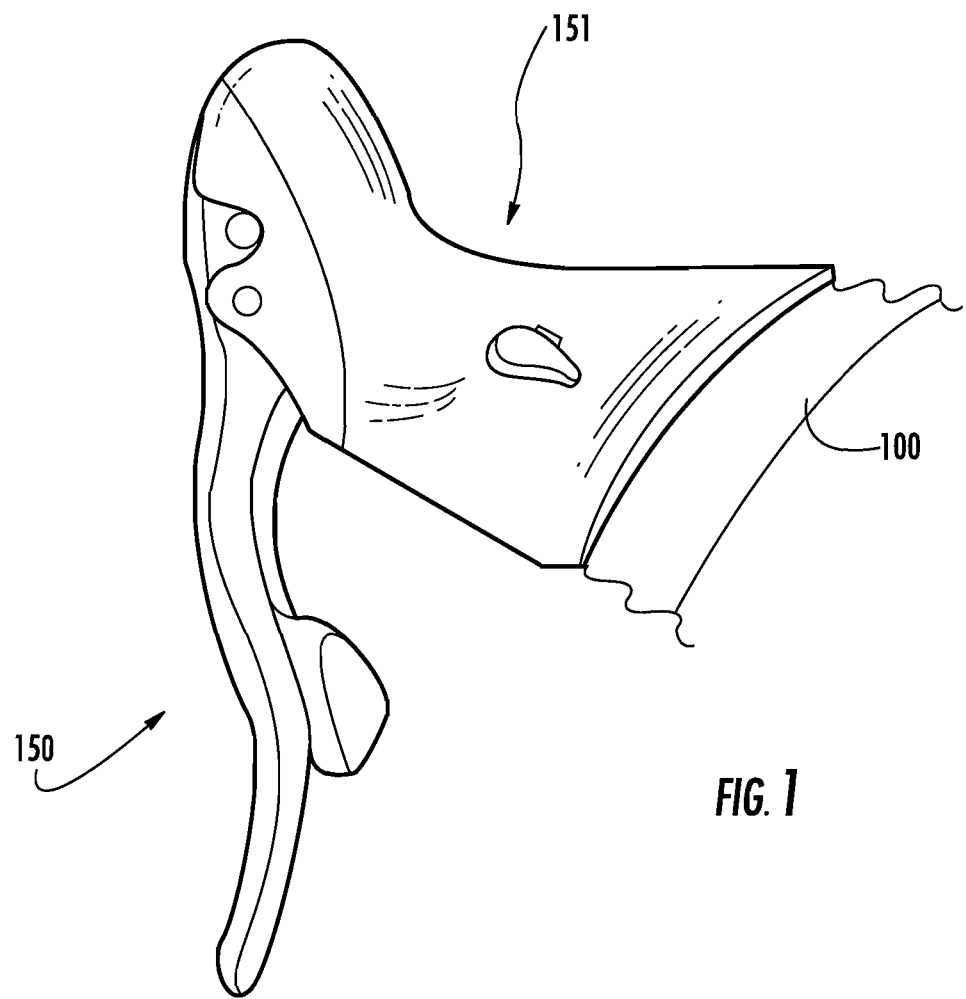
FIG. 1 is a side view of a known control device.

The control device is adapted to be used in a racing bicycle, i.e., in a bicycle whose handlebar has opposite curved free end portions.

A bicycle can comprise the aforementioned control device.

Further, a kit of parts can be assembled to form the aforementioned control device.

Throughout the present description and in the subsequent claims, the spatial terms, in particular the terms front, rear, side, upper, lower, vertical, and horizontal, are used with reference to the mounted condition of the control device on the handlebar of the bicycle. The terms inner and outer, on the other hand, with reference to the handlebar in a neutral position, identify the area towards the center of the handlebar and the area opposite the center of the handlebar with respect to an intermediate reference plane which substantially vertically passes through the control device.

In a first aspect thereof, a control device for a bicycle comprises a first body adapted to be associated with a bicycle handlebar, at least one control member of at least one bicycle component, and a second body, distinct from the first body, associated with the first body.

The control device that is formed from two distinct bodies can be associated with each other allows the cyclist to adapt the control device to the size of his hand. The cyclist has the possibility of increasing the hand rest surface and/or of modifying the relative positioning of the control members with respect to the handlebar.

A suitable coupling and positioning of the second body at suitable surfaces of the first body allows the hand rest surface to be increased. In this case, the aforementioned first body defines a first grip portion of the control device and the second body defines a second grip portion of the control device.

A suitable coupling and positioning of the second body at suitable surfaces of the first body also allows the space between the possible derailleur actuation lever arranged behind a brake lever to be increased.

In this case, the second body is associated with the first body so as to be operatively interposed between the first body and the handlebar of the bicycle when the first body is associated with such handlebar.

A suitable coupling and positioning of the second body at suitable surfaces of the first body also allows the distance between the brake lever and the handlebar to be reduced.

Also in this case, the second body is associated with the first body so as to be operatively interposed between the first body and the handlebar of the bicycle when the first body is associated with such handlebar.

The second body is associated with the first body at respective coupling surfaces having a matching shape. In particular, a shape coupling is made between the second body and the first body.

In a first embodiment of the control device, the second body is positioned in a single predetermined position with respect to the first body. In this case a plurality (for example three) of second bodies of different shapes and sizes can be provided so as to allow the cyclist to select the most suitable one, according to the size of his own hand.

In this case, the coupling between the first body and the second body can, for example, be carried out through screws, glue, or through a snap coupling or a dap joint. A simple shape coupling can also be carried out in which the coupling of the two matching surfaces is maintained by the holding action exerted by an outer coating sheath that covers the first body and the second body.

In an alternative embodiment thereof, the control device comprises at least one adjustment member of the position of the second body with respect to the first body. The cyclist in this case has the opportunity to precisely adjust the relative positioning of the second body with respect to the first body.

This adjustment member comprises a screw/female screw coupling operatively interposed between the first body and the second body, wherein one from the screw and the female screw is associated with one from the first body and the second body and the other from the screw and the female screw is associated with the other from the first body and the second body.

The second body is removably associated with the first body, so as to be able to allow an interchangeability of the second bodies.

Irrespective of the specific embodiment of the control device, an outer coating sheath covers the first body and the second body. Such a sheath also carries out the function of keeping the coupling surfaces of the first body and of the second body in contact with each other, ensuring the coupling between first body and second body even in the absence of further connection means such as glue or screws.

The control device comprises various embodiments, including wherein the second body is associated with a lower surface, an inner side surface, an outer side surface, an upper surface and a rear surface, respectively, of the first body and extends fully or only partially over one or more of the aforementioned surfaces of the first body. When the second body is associated with the rear surface of the first body, the second body is operatively interposed between the first body and the handlebar when the first body is associated with the handlebar.

In a second aspect thereof, a bicycle comprising the control device described above has all of the structural and functional characteristics discussed above with reference to the control device individually or in combination.

In a third aspect thereof, a kit of parts for the assembly of a control device for a bicycle, comprises a first body adapted to be associated with a bicycle handlebar and provided with at least one control member of at least one bicycle component, and at least two second bodies adapted to be selectively associated with the first body, wherein the at least two second bodies differ in at least one from shape and size.

The aforementioned kit of parts allows the cyclist to adapt the control device to the size of his own hand, increasing the hand rest surface and/or modifying the relative positioning of the control members with respect to the handlebar.

DETAILED DESCRIPTION

The following description is made with reference to a right control device, i.e., a control device that is adapted to be associated with the handlebar of the bicycle at the curved end portion of the handlebar that, looking at the handlebar in the neutral position thereof and from a point of view like that of the cyclist during travel, is located to the right of the cyclist. However, it is clear that what is described has analogous application in the case of a left control device.

FIG. 1 shows a known control device 150. Such a device comprises a main body 151 made in a single piece. The main body 151 is adapted to be mounted on the handlebar of a racing bicycle at the opposite curved end portions of the handlebar.

FIGS. 2-15, on the other hand, show various embodiments of a control device 1.

In all of these embodiments, the control device 1 comprises a first body 20 and a second body 30 associated with the first body 20.

The control device 1 is adapted to be fixed, at a rear wall 3 thereof, to a curved end portion of a handlebar 100 of a racing bicycle, so as to project ahead of the handlebar to be gripped by the cyclist in particular racing situations as in, for example, climbing or sprinting.

The attachment of the control device 1 to the handlebar of the bicycle takes place through conventional connection means (not illustrated) as, for example, a clip.

The control device 1 is defined, as well as by the rear wall 3, by an outer side wall 4 (FIGS. 2a, 3, 4, 6-8), an inner side wall 5 arranged on the opposite side to the outer side wall 4 with respect to an intermediate reference plane P (FIGS. 2a, 3, 4, 6-8) vertically passing through the first body 20, an upper transversal wall 6 connecting the outer side wall 4 and the inner side wall 5 together and a lower transversal wall 7 opposite the upper transversal wall 6.

Throughout the present description and in the subsequent claims, the expression "intermediate reference plane" is used to indicate any substantially vertical plane that passes through the control device, not necessarily a plane of symmetry or a middle plane of such a control device.

All the walls of the control device 1 are covered by an outer coating sheath G.

In all the embodiments illustrated in the attached figures, the first body 20 is shaped so as to make it easier for the cyclist to grip it. Therefore, it has a projection 100 upwards in a front portion 10 thereof. Thus the upper wall 6a of the body 20 has a substantially saddle-shaped profile, as illustrated in FIGS. 2, 2a, 5, 10-15.

Figure 2:
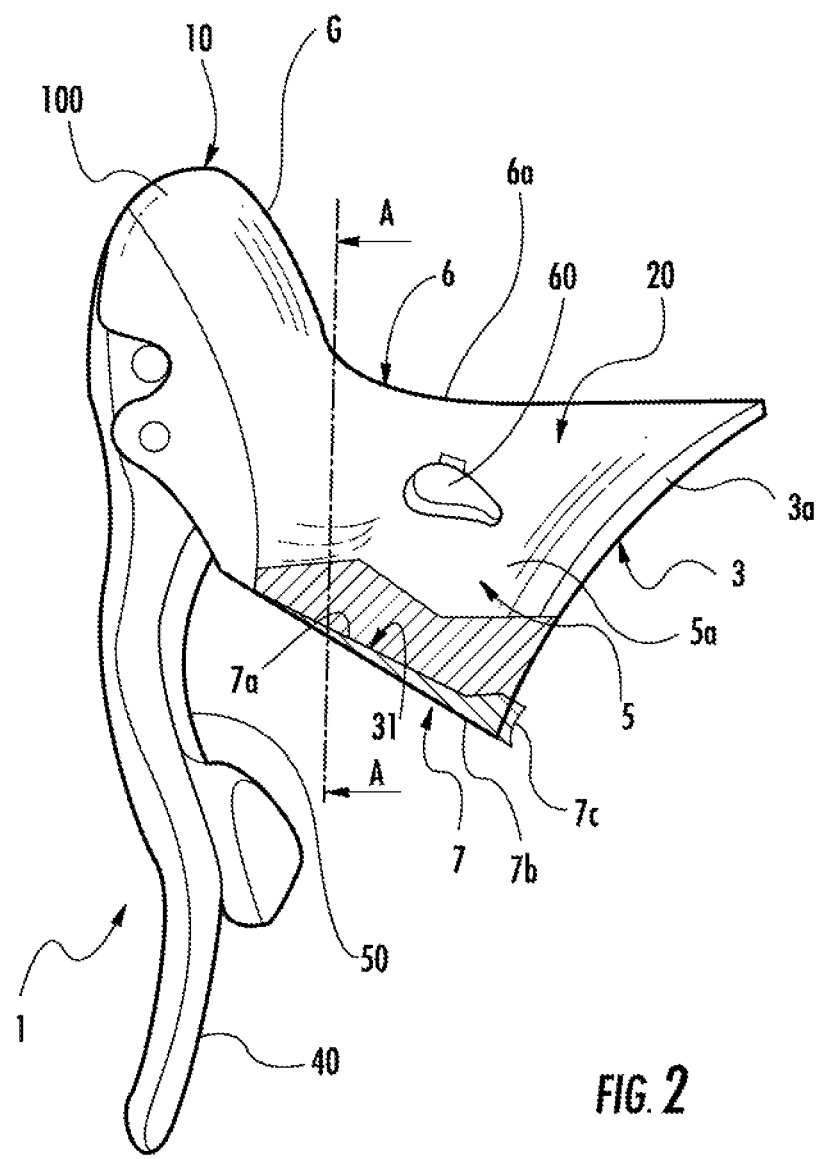
FIG. 2 is a side view partially in section of a first embodiment of a control device.

In the embodiment illustrated in FIGS. 2 and 2a, the outer side wall 4, the inner side wall 5, the upper transversal wall 6 and the rear wall 3 of the control device 1 are defined by an outer side surface 4a, an inner side surface 5a, an upper transversal surface 6a and a rear surface 3a of the first body 20, respectively, whereas the lower transversal wall 7 of the control device 1 is fully defined by a lower transversal surface 7b of the second body 30.

An alternative embodiment of the control device 1 illustrated in FIGS. 2 and 2a can be provided, wherein the lower transversal wall 7 of the control device 1 is defined in part by the lower transversal surface 7b of the second body 30 and in part by a lower transversal surface 7a of the first body 20. In this case, the second body 30 is shorter in length than the first body 20 at the respective lower transversal surfaces 7a and 7b. The control device 1 comprises, at the front portion 10 of the first body 20, a brake cable actuation lever 40. The lever 40 is hinged to the first body 20 at the upper part of the first body 20 in a conventional way.

The control device 1 further comprises an actuation lever 50 of a derailleur (in particular of a rear derailleur) in a first gearshifting direction. The lever 50 is arranged behind the brake lever 40 and is articulated to the first body 20 in a conventional way.

The control device 1 then comprises a derailleur actuation lever 60 in a gearshifting direction opposite the one in which the derailleur is actuated by acting upon the lever 50. The lever 60 is articulated to the first body 20 at the inner side surface 5a thereof and projects from it. The lever 50 and the lever 60 act upon a mechanical-type control device arranged inside the first body 20 as, for example, described in U.S. Pat. No. 6,792,826 to the same Applicant, incorporated herein by reference.

The second body 30 has a coupling surface 31 with the first body 20.

The second body 30 can be associated with the first body 20 at any of the various surfaces of the first body 20.

With particular reference to the embodiment illustrated in FIGS. 2 and 2a, the second body 30 is associated with the first body 20 at the lower surface 7a of the first body 20 and extends substantially over the entire lower surface 7a of the first body 20. The second body 30 can be positioned with respect to the first body 20 so as to define a single predetermined relative position. Between the lower surface 7a of the first body 20 and the coupling surface 31 of the second body 30, an adhesive substance can be arranged, for example a glue, but other coupling means can be provided such as, for example, screws. It is also possible to simply provide a shape coupling between matching surfaces 7a and 31 of the first body 20 and of the second body 30, such a coupling being kept operative by the compression action exerted by the outer coating sheath G. The coupling between the surface 7a of the first body 20 and the matching surface 31 of the second body 30 can also be a snap or dap joint coupling.

In the embodiment illustrated in FIGS. 2 and 2a, the outer side wall 4 and the inner side part 5 of the control device 1 have respective surfaces substantially parallel to the intermediate reference plane P, apart from small convexities and roundings.

When the cyclist grips the control device 1, part of the palm of his hand rests on the upper transversal wall 6 and part on the outer side wall 4. The fingers of the hand, meanwhile, rest upon part of the outer side wall 4, upon the lower transversal wall 7 and upon the inner side wall 5. The thumb embraces the control device 1 from the top resting upon the surface of the inner side wall 5, whereas the other fingers embrace the control device from the bottom with their ends resting upon the surface of the inner side wall 5. Comparing FIGS. 2 and 2a with FIG. 1, it can be seen how the use of the second body 30 causes on the control device 1 an increase of the rest surface for the cyclist's hand.

The second body 30 can also comprise a portion 7c (shown with a broken line in FIG. 2) that, projecting rearwardly with respect to the first body 20, allows the levers 40 and 50 to be moved away from the handlebar.

Figure 16:
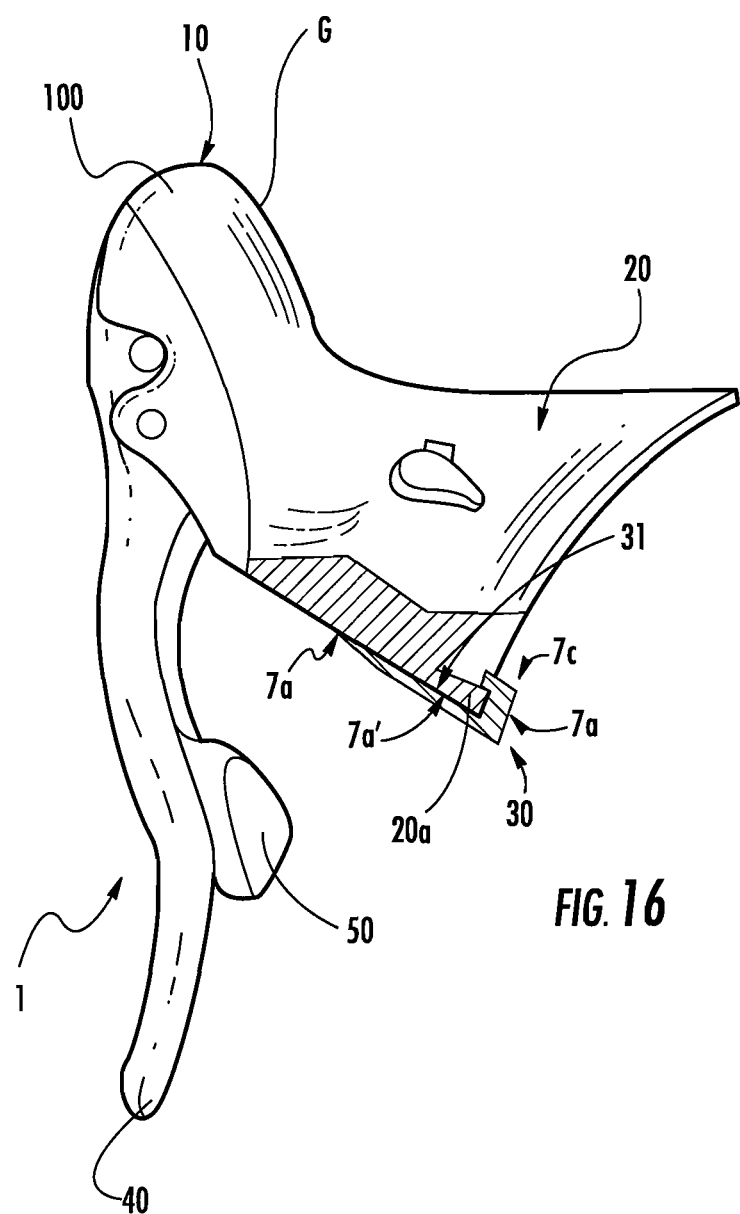
FIG. 16 is a side view partially in section of a further embodiment of a control device.

FIG. 16 shows an alternative embodiment of a control device. In the embodiment shown in FIG. 16, the second body 30 is associated with the first body 20 at the lower surface 7a of the first body 20 and extends for a short part of such a lower surface 7a. The second body 30 comprises a portion 7c that, projecting rearwardly with respect to the first body 20, allows the control device 1 to be positioned on the handlebar in a rotated position with respect to that of a conventional control device, with the levers 40 and 50 being more distant from the handlebar. This is a favourable configuration in the case of cyclists with large hands.

Figure 16A:
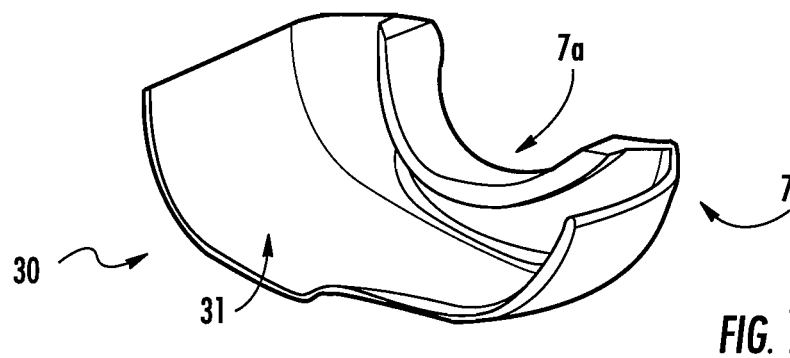
FIG. 16a is a perspective view of an element (second body) of the control device of FIG. 16.
Figure 16B:
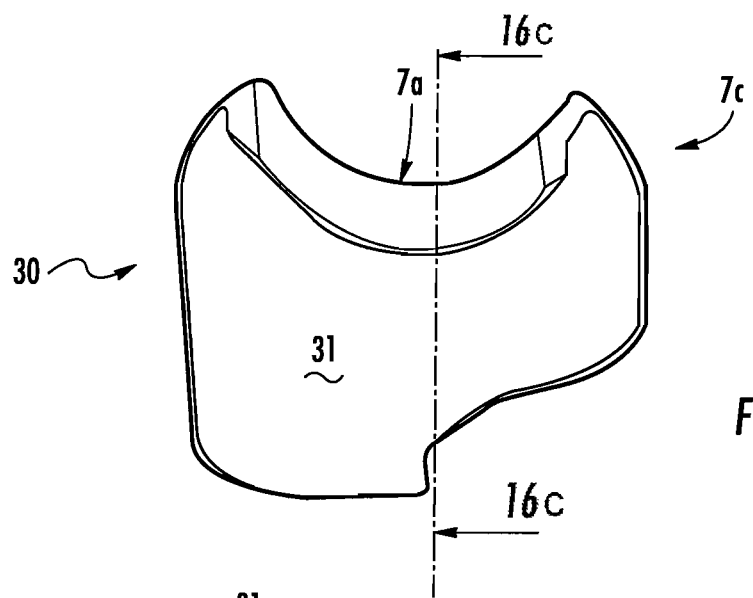
Figure 16C:
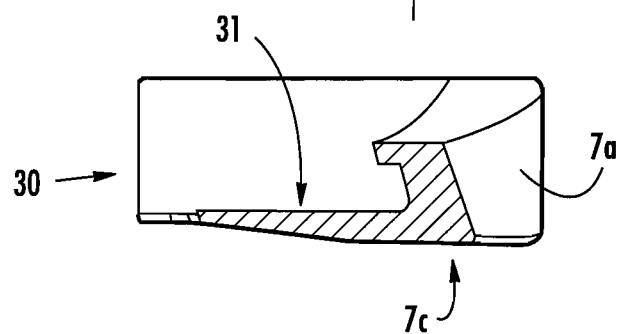
FIG. 16c is a sectional view along the plane Z-Z of FIG. 16b.

More specifically, as also shown in FIGS. 16a to 16c, the second body 30 has a coupling surface 31 having a shape which substantially match that of the part 7a' of the lower surface 7a against which it is in contact, while the projecting portion 7c is substantially U-shaped and is coupled with an edge 20a of the first body 20. Such a coupling occurs substantially by mechanical interference. The rear part 7e of the projecting portion 7c, that is the part which faces the handlebar, has a substantially cylindrical shape adapted to couple with the substantially cylindrical outer surface of the handlebar.

Figure 17:
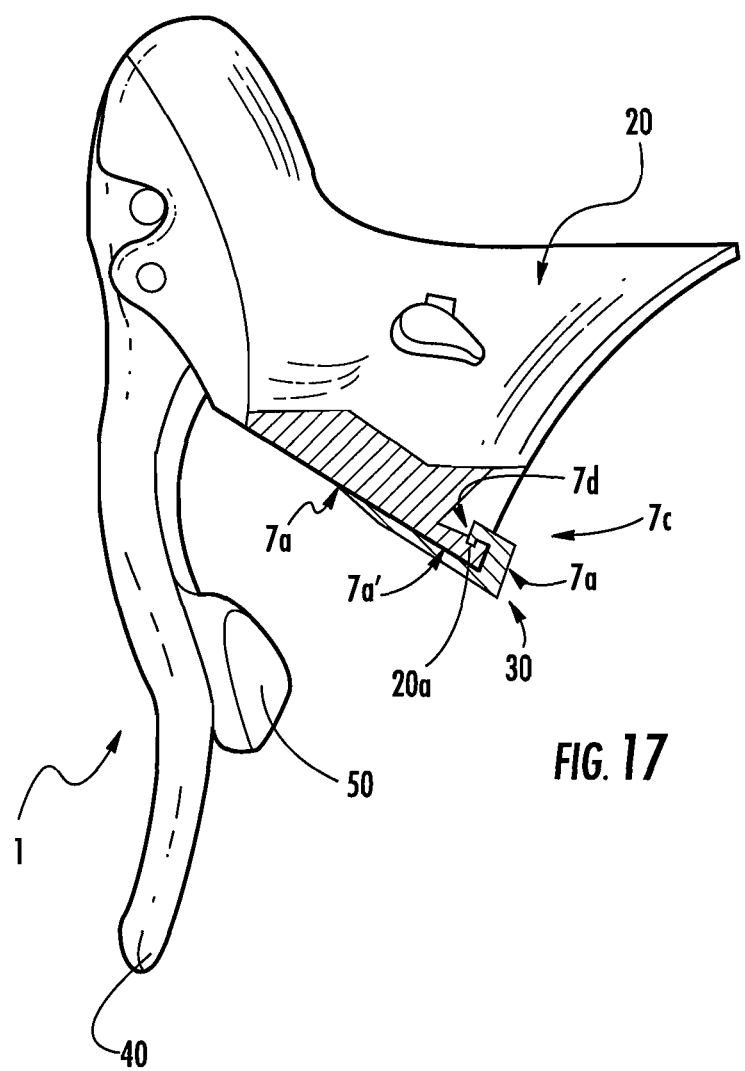
FIG. 17 is a side view partially in section of a further embodiment of a control device.

The alternative embodiment of FIG. 17 differs from that of FIG. 16 in that the U-shaped end part has an undercut edge 7d. The area of the projecting portion 7c where is formed such an undercut edge 7d is preferably elastically pliable so that the second body 30 can be snap coupled to the first body 20.

FIGS. 3 and 4 show alternative embodiments of the control device 1. In FIGS. 3 and 4, elements corresponding to those described above with reference to the embodiment illustrated in FIGS. 2 and 2a are indicated with the same reference numeral.

The embodiments illustrated in FIGS. 3 and 4 differ from the one illustrated in FIGS. 2 and 2a only for the size of the second body 30. In particular, the height of the second body 30 of FIG. 3 is greater than that of the second body 30 of FIGS. 2 and 2a and the height of the second body 30 of FIG. 4 is greater than that of the second body 30 of FIG. 3. Comparing FIGS. 2a, 3, and 4 it can be seen how, as the height of the second body 30 increases, the rest surface for the cyclist's hand increases.

The coupling between the first body 20 and the second body 30 can be of the removable type.

A removable coupling can, for example, be made by providing a coupling through screws, or through shape coupling at the matching surfaces of the first body 20 and of the second body 30.

Figure 5:
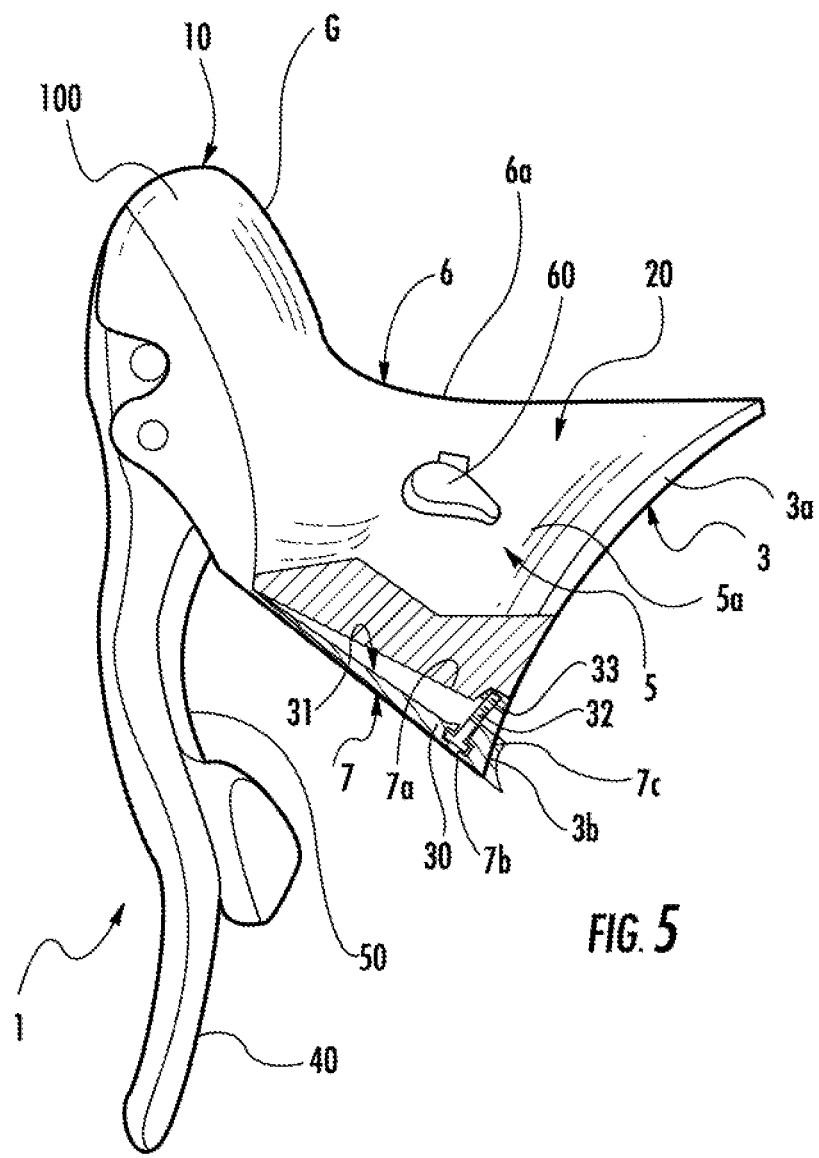
FIG. 5 is a side view partially in section of a further embodiment of the control device.

FIG. 5 illustrates an embodiment of the control device 1 which differs from that of FIGS. 2 and 2a only in that the coupling between the first body 20 and the second body 30 is of the adjustable type. The elements of FIG. 5 corresponding to those described above with reference to the embodiment illustrated in FIGS. 2 and 2a are indicated with the same reference numeral.

In the embodiment of FIG. 5, an adjustment member of the relative position between the second body 30 and the first body 20 is provided so as to be able to adjust the position of the second body 30 with respect to the first body 20 as desired. In particular, such an adjustment member comprises an adjustment screw 32 associated, at one end thereof, with the second body 30 and, at the opposite end thereof, with a female screw 33 fixedly connected to the first body 20. Alternatively, the screw 32 can be associated with the first body 20 and the female screw 33 can be fixedly connected to the second body 30.

The second body 30 can also comprise a portion 7*c* (shown with a broken line in FIG. 5) which projects rearwardly with respect to the first body 20. In this case, by acting upon the screw 32 the grip surface of the control device 1 and the distance of the levers 40 and 50 from the handlebar are simultaneously adjusted.

Figure 6:
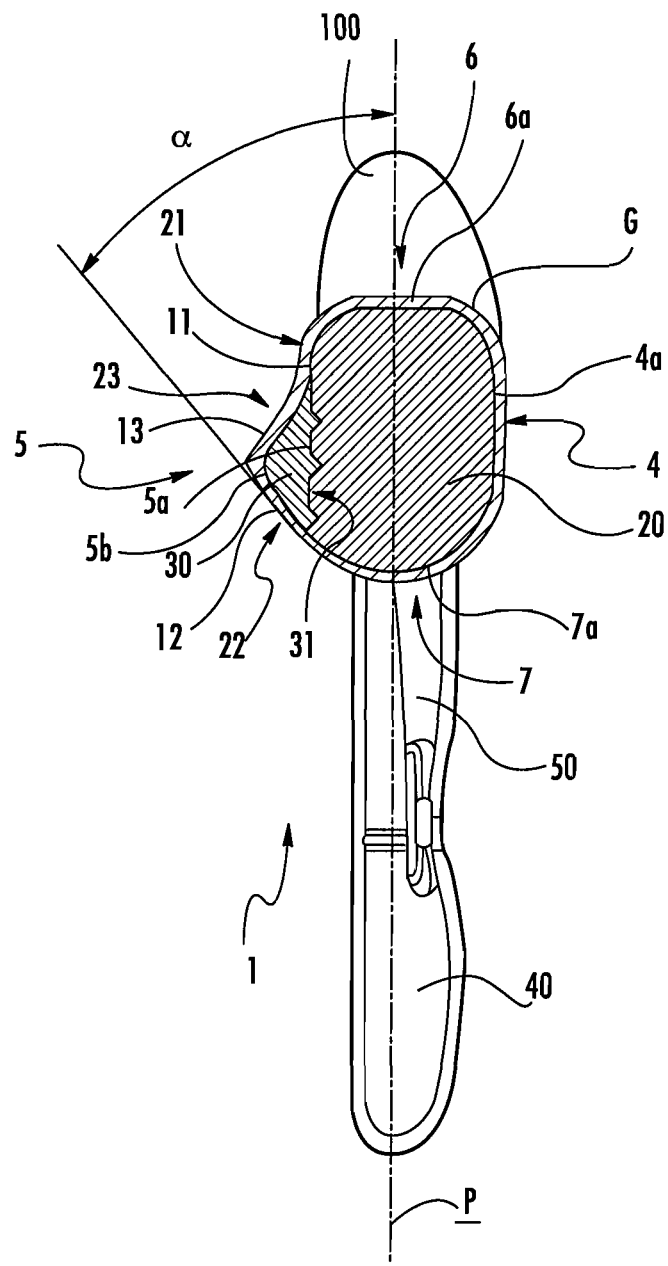
FIGS. 6 to 8 are sectional views of three further alternative embodiments of the control device.
Figure 7:
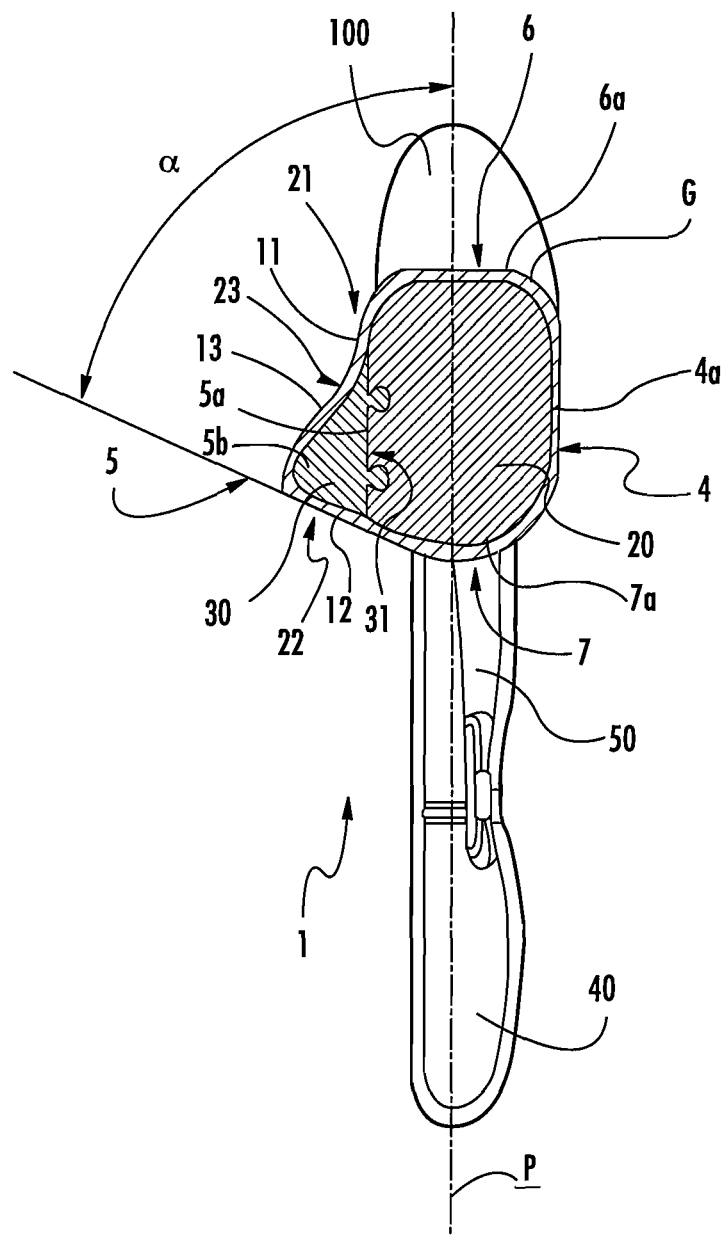
Figure 8:
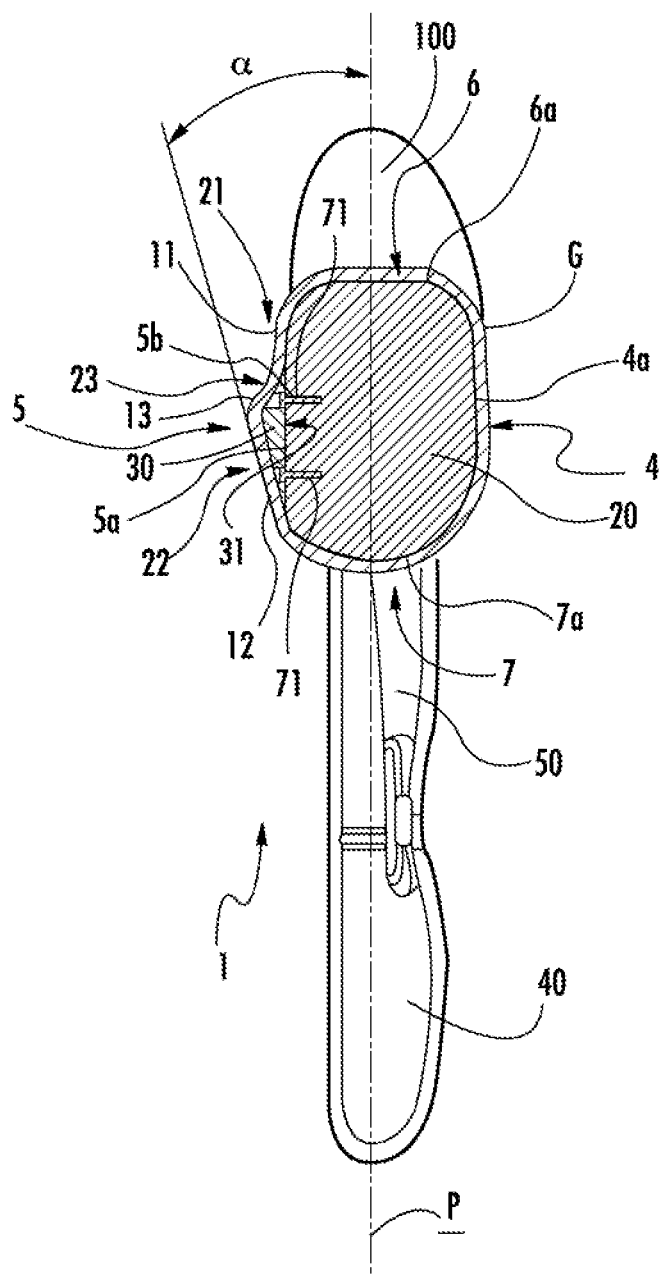

Further alternative embodiments of the control device 1 are provided as in, for example, those illustrated in FIGS. 6, 7, and 8. In such figures, elements corresponding to those described above with reference to the embodiment illustrated in FIGS. 2 and 2*a* are indicated with the same reference numeral.

The embodiments of FIGS. 6-8 differ from the one illustrated in FIGS. 2 and 2*a* in that the second body 30 is associated with the first body 20 at an inner side surface 5*a* of the first body 20 and in that the inner side wall 5 of the control device 1 has surface portions not parallel to the intermediate reference plane P.

The inner side part 5 of the control device 1 is in this case defined in part by an inner side surface 5*b* of the second body 30 and in part by an inner side surface 5*a* of the first body 20, whereas the outer side wall 4, the upper transversal wall 6, the lower transversal wall 7, and the rear wall 3 of the control device 1 are, on the other hand, defined by an outer side surface 4*a*, an upper transversal surface 6*a*, a lower transversal surface 7*a*, and a rear surface 3*a*, respectively, of the first body 20.

Alternative embodiments of the control device 1 illustrated in FIGS. 6-8 can be provided, wherein the inner side wall 5 of the control device 1 is defined integrally by the inner side surface 5*b* of the second body 30. In this case, the second body 30 has a height substantially equal to that of the first body 20 at the respective inner side surfaces 5*a* and 5*b*.

The inner side wall 5 of the control device 1 has an upper portion 21, a lower portion 22, and an intermediate portion 23. The lower portion 22 and the intermediate portion 23 are defined in the second body 30, whereas the upper portion 21 is defined in the first body 20.

The upper portion 21 has a surface 11 substantially parallel to the intermediate reference plane P, and therefore to the surface of the outer side portion 4, again apart from small convexities and roundings. The lower portion 22, on the other hand, has a surface 12 which is inclined by an angle α with respect to the plane P. Between the surface 11 of the upper portion 21 and the surface 12 of the lower portion 22, an intermediate surface 13 is defined. Such an intermediate surface 13 is therefore defined at the intermediate portion 23 of the inner side wall 5 of the control device 1.

The orientation of the surface 12 of the lower portion 22 of the inner side wall 5 is such that the surface 12 moves away from the intermediate reference plane P (and therefore from the outer side wall 4) as one moves along the inner side wall 5 from the lower portion 22 towards the upper portion 21, i.e., from the bottom towards the top.

The angle α of inclination can be selected within the range of values between 20° and 60°.

However, in the preferred embodiment of the control device 1, the angle α is within the range of values between 30° and 50°, and preferably is substantially equal to 40°.

The orientation of the intermediate surface 13, on the other hand, is such that the surface 13 goes towards the intermediate reference plane P (and therefore to the outer side wall 4) as one moves along the inner side wall 5 from the lower portion 22 towards the upper portion 21.

The surface 12 of the lower portion 22 of the inner side wall 5 and the intermediate surface 13 define an enlargement of the control device 1 which has, in a direction from the bottom towards the top, an extension greater than the extension of the surface 11 of the upper portion 21 of the side wall 5.

In an alternative embodiment (not illustrated) of the control device, the coupling between the first body 20 and the second body 30 can be made at the outer side wall 4*a* of the first body 20.

FIG. 6 illustrates in particular an embodiment of the control device 1 wherein the coupling between the second body 30, in which the lower portion 22 and the intermediate portion 23 of the inner side wall 5 are defined, and the first body 20 takes place at respective coupling surfaces having a matching shape. The two coupling surfaces are kept in abutment against one another by the outer coating sheath G. In the illustrated example, the angle of inclination a is substantially equal to 40°, but the value of such an angle can be anything within the range between 20° and 60°.

FIG. 7, on the other hand, illustrates an embodiment of the control device 1, wherein the coupling between the second body 30, in which the lower portion 22 and the intermediate portion 23 of the inner side wall 5 of the control device 1 are defined, and the first body 20 is a snap coupling. In the illustrated example, the angle of inclination a is substantially equal to 60°, but the value of such an angle can be anything within the range between 20° and 60°.

FIG. 8 illustrates a further embodiment of the control device 1, wherein the coupling between the second body 30, in which the lower portion 22 and the intermediate portion 23 of the inner side wall 5 of the control device 1 are defined, and the first body 20 takes place through screws 71. In the illustrated example, the angle of inclination a is substantially equal to 20°, but the value of such an angle can be anything within the range between 20° and 60°.

In a further embodiment of the control device 1, or possibly also in the embodiments illustrated in FIGS. 6, 7, and 8, between the coupling surfaces 31 of the second body 30 and 5*a* of the first body 20, an adhesive substance can be arranged as, for example, a glue.

In the embodiments illustrated in FIGS. 6-8, when the cyclist grips the control device 1, part of the palm of his hand rests upon the upper transversal wall 6 and part upon the outer side wall 4. The fingers of the hand, meanwhile, rest upon part of the outer side wall 4, upon the lower transversal wall 7, and upon the inner side wall 5. The thumb embraces the control device 1 from the top resting upon the surface 11 of the upper portion 21 or upon the surface 13 of the intermediate portion 23 of the inner side wall 5, whereas the other fingers embrace the control device 1 from the bottom with their ends resting upon the surface 12 of the lower portion 22 of the inner side wall 5.

Figure 9:
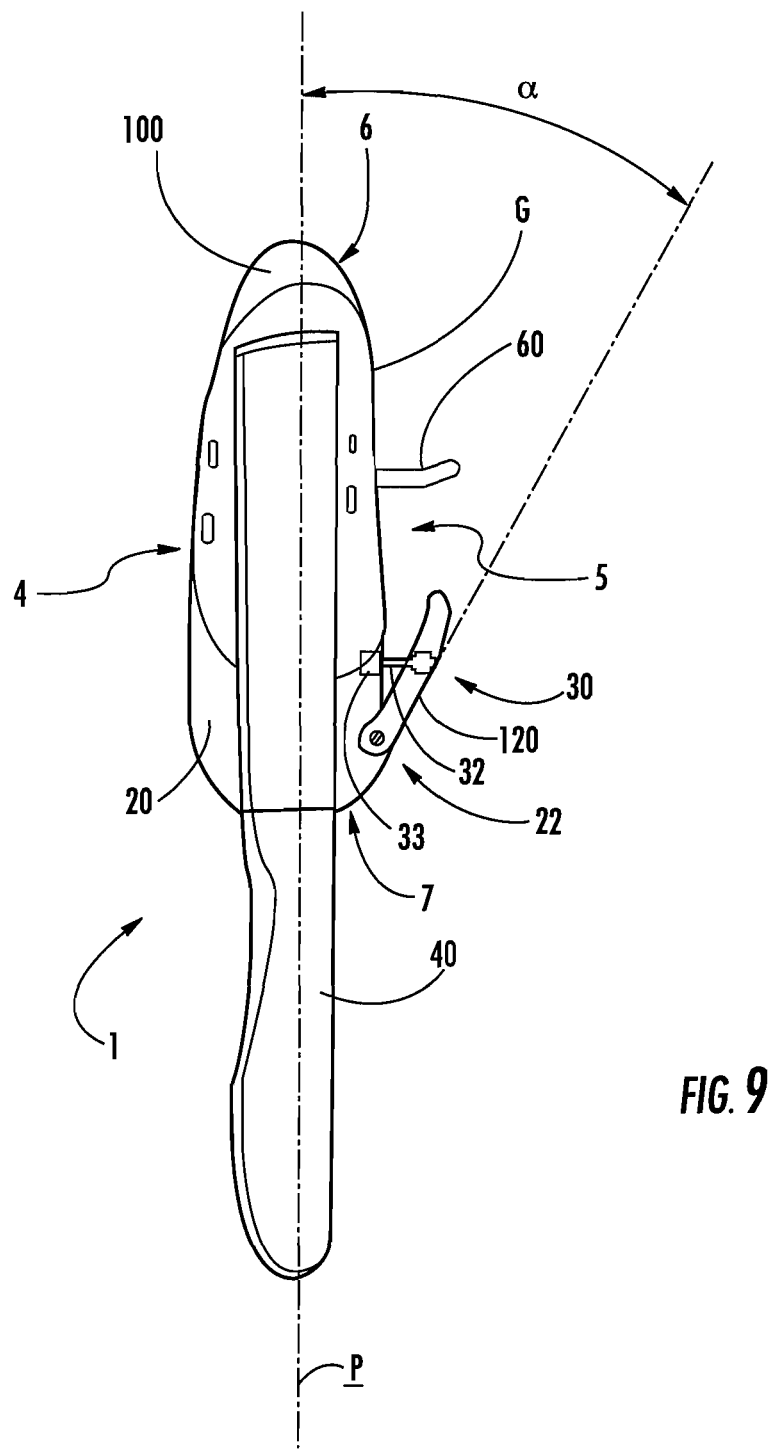
FIG. 9 is a schematic front view of a further embodiment of the control device.

FIG. 9 shows a further alternative embodiment of the control device 1. In this figure, elements corresponding to those described above with reference to the embodiment illustrated in FIGS. 2 and 2*a* are indicated with the same reference numeral.

The embodiment of FIG. 9 differs from the one illustrated in FIGS. 2 and 2a only in that, in this embodiment, the second body 30 is defined by a finger rest element 120 associated with the first body 20 at a lower portion 22 of the latter. The finger rest element 120 extends according to a direction inclined by the angle α with respect to the intermediate reference plane P. Between the finger rest element 120 and the first body 20 an inclination adjustment member of the finger rest element 120 with respect to the first body 20 is provided. In the illustrated example, such an adjustment member comprises an adjustment screw 32 associated, at one end thereof, with a female screw 33 fixedly connected to the first body 20 and, at the opposite end thereof, with the finger rest element 120. Alternatively, the screw 32 can be associated with the finger rest element 120 and the female screw 33 can be fixedly connected to the first body 20.

When the cyclist grips the control device 1, part of the palm of his hand rests upon the upper transversal wall 6 and part upon the outer side wall 4. The fingers of the hand, meanwhile, rest upon part of the outer side wall 4, upon the lower transversal wall 7, and upon the inner side wall 5. The thumb embraces the control device 1 from the top resting upon the surface of the inner side wall 5, whereas the other fingers embrace the control device 1 from the bottom with their ends resting upon the finger rest element 120.

Figure 10:
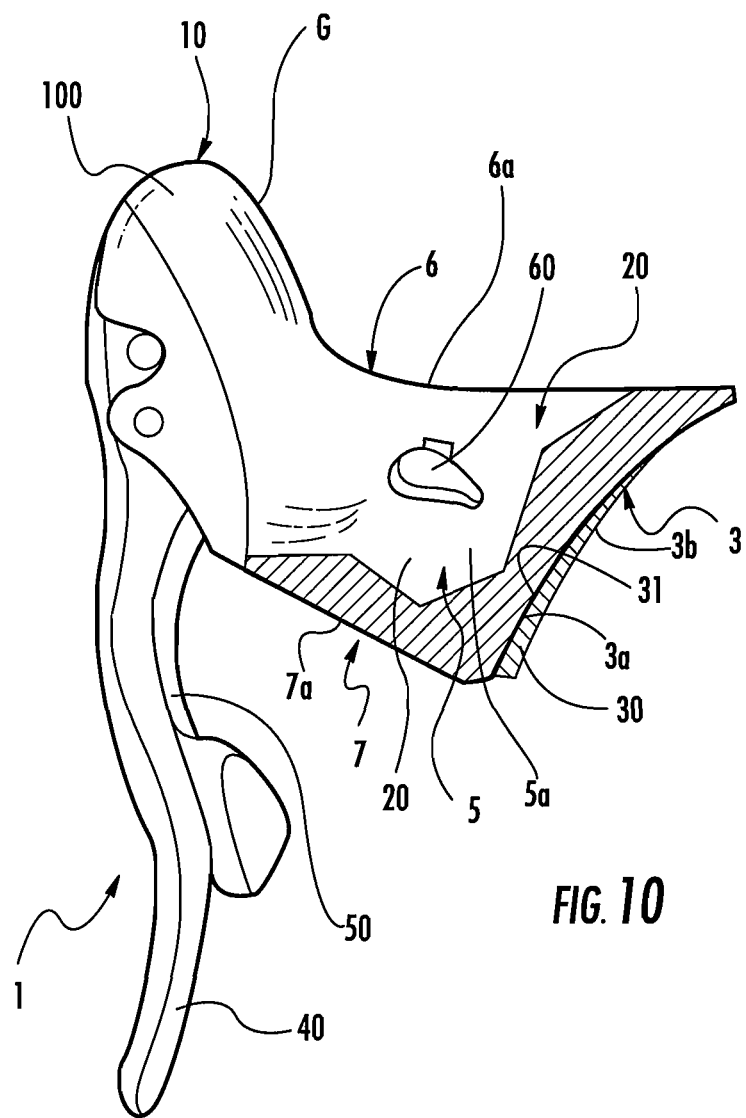
FIGS. 10-15 are side views partially in section of further alternative embodiments of the control device.

FIG. 10 illustrates a further embodiment of the control device 1. Such an embodiment differs from that of FIGS. 2 and 2a only in that the second body 30 is associated with the first body 20 at the rear surface 3a of the latter and extends over a part of the rear surface 3a, with the thicker part of the second body 30 arranged at the lower part of the rear surface 3a of the first body 20. In FIG. 10, elements corresponding to those described above with reference to the embodiment illustrated in FIGS. 2 and 2a are indicated with the same reference numeral.

The second body 30 can be positioned with respect to the first body 20 so as to define a single predetermined relative position. Between the rear surface 3a of the first body 20 and the coupling surface 31 of the second body 30 an adhesive substance can be provided as in, for example, a glue.

In the embodiment of FIG. 10, the rear wall 3 of the control device 1 is defined in part by the rear surface 3a of the first body 20 and in part by the rear surface 3b of the second body 30, whereas the outer side wall 4, the inner side wall 5, the upper transversal wall 6, and the lower transversal wall 7 of the control device 1 are, on the other hand, defined by an outer side surface 4a, an inner side surface 5a, an upper transversal surface 6a, and a lower transversal surface 7a, respectively, of the first body 20.

An alternative embodiment of the control device 1 illustrated in FIG. 10 can be provided, wherein the rear wall 3 of the control device 1 is integrally defined by the rear surface 3b of the second body 30. In this case, the second body 30 has a height substantially equal to that of the first body 20 at the respective rear surfaces 3a and 3b.

The use of a coupling configuration like the one illustrated in FIG. 10 allows the control device 1 of FIG. 10 to be positioned on the handlebar in a rotated position with respect to a conventional device, with the levers 40 and 50 being at a greater distance from the handlebar. This situation is favorable for cyclists with large hands.

Figure 11:
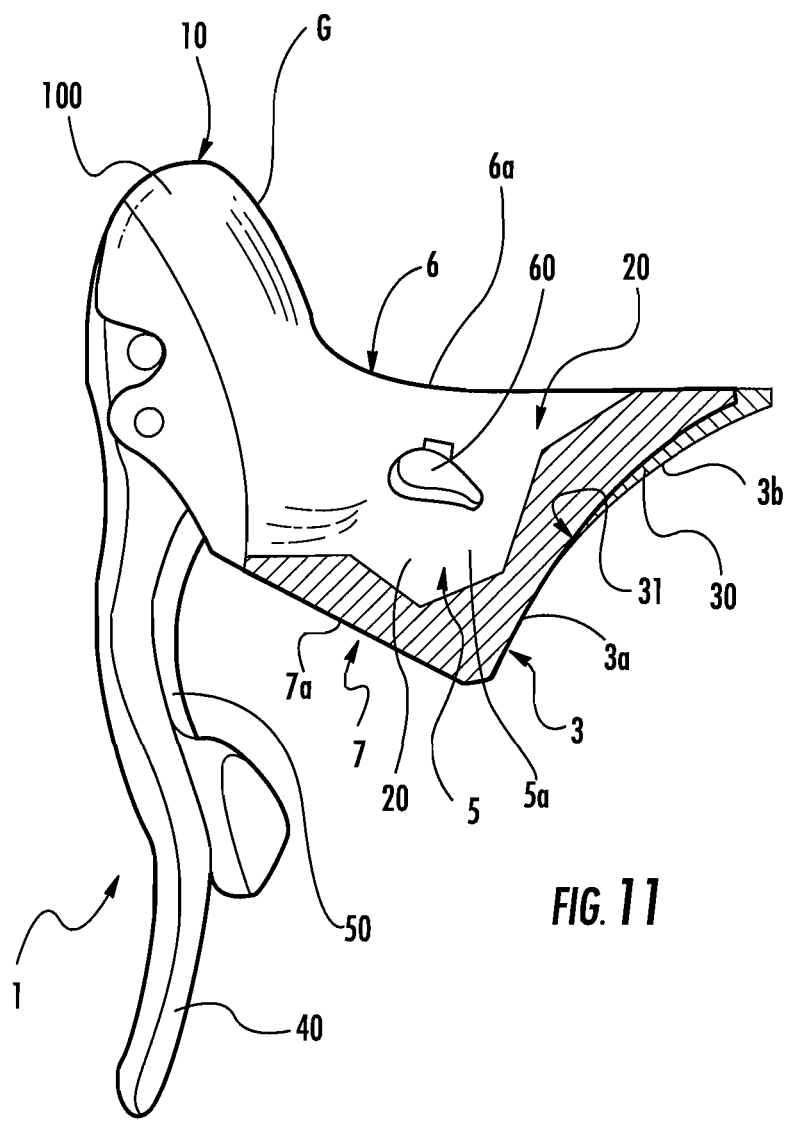

FIG. 11 illustrates a further embodiment of the control device 1. Such an embodiment differs from that of FIG. 10 only in that the second body 30 is associated with the first body 20 on a part of the rear surface 3a of the latter with the thickest part of the second body 30 arranged at the upper part of the rear surface 3a of the first body 20. The use of a coupling configuration like the one illustrated in FIG. 11 allows the control device 1 of FIG. 10 to be positioned on the handlebar in a rotated position with respect to a conventional device, with the levers 40 and 50 being closer to the handlebar. This situation is favorable for cyclists with small hands.

An alternative embodiment of the control device 1 illustrated in FIG. 11 can be provided, wherein the rear wall 3 of the control device 1 is integrally defined by the rear surface 3b of the second body 30. In this case, the second body 30 has a height substantially equal to that of the first body 20 at the respective rear surfaces 3a and 3b.

Figure 12:
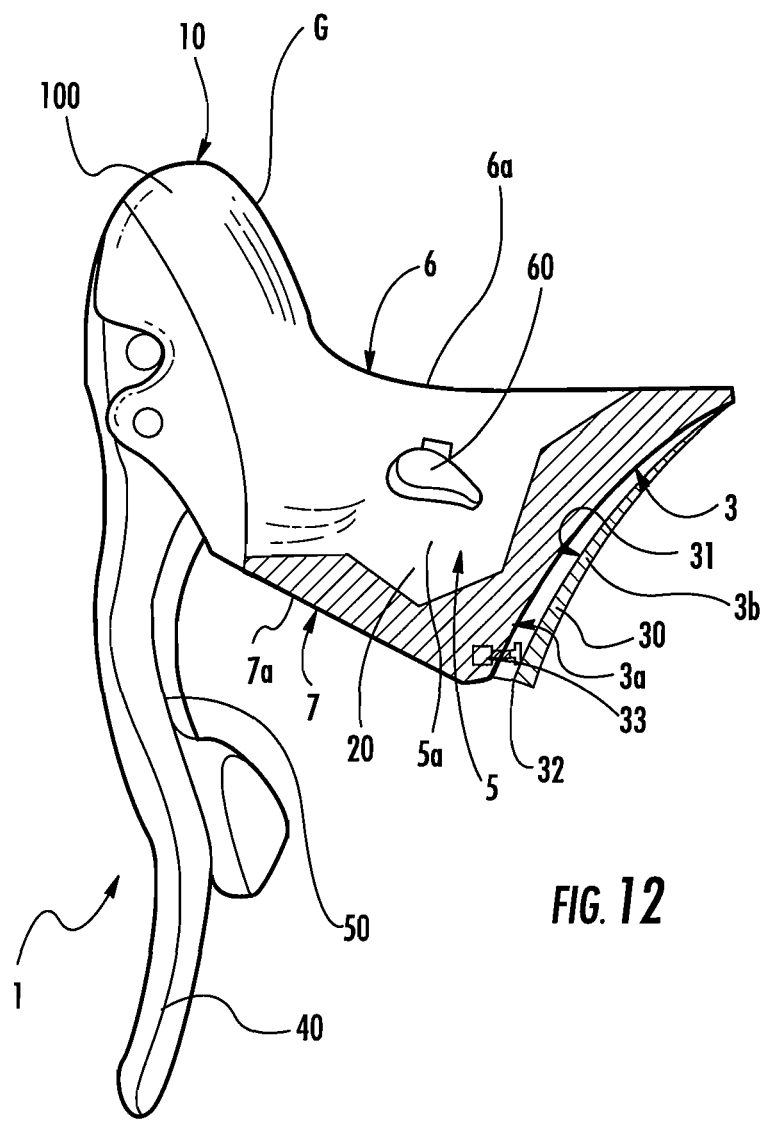

FIG. 12 illustrates a further embodiment of the control device 1. Such an embodiment differs from that of FIG. 10 in that an adjustment member of the relative position between the second body 30 and the first body 20 is provided so as to adjust the position of the second body 30 with respect to the first body 20 as desired. In particular, such an adjustment member comprises an adjustment screw 32 associated, at one end thereof, with the second body 30 and, at the opposite end thereof, with a female screw 33 fixedly connected to the first body 20. Alternatively, the screw 32 can be associated with the first body 20 and the female screw 33 can be fixedly connected to the second body 30.

Figure 13:
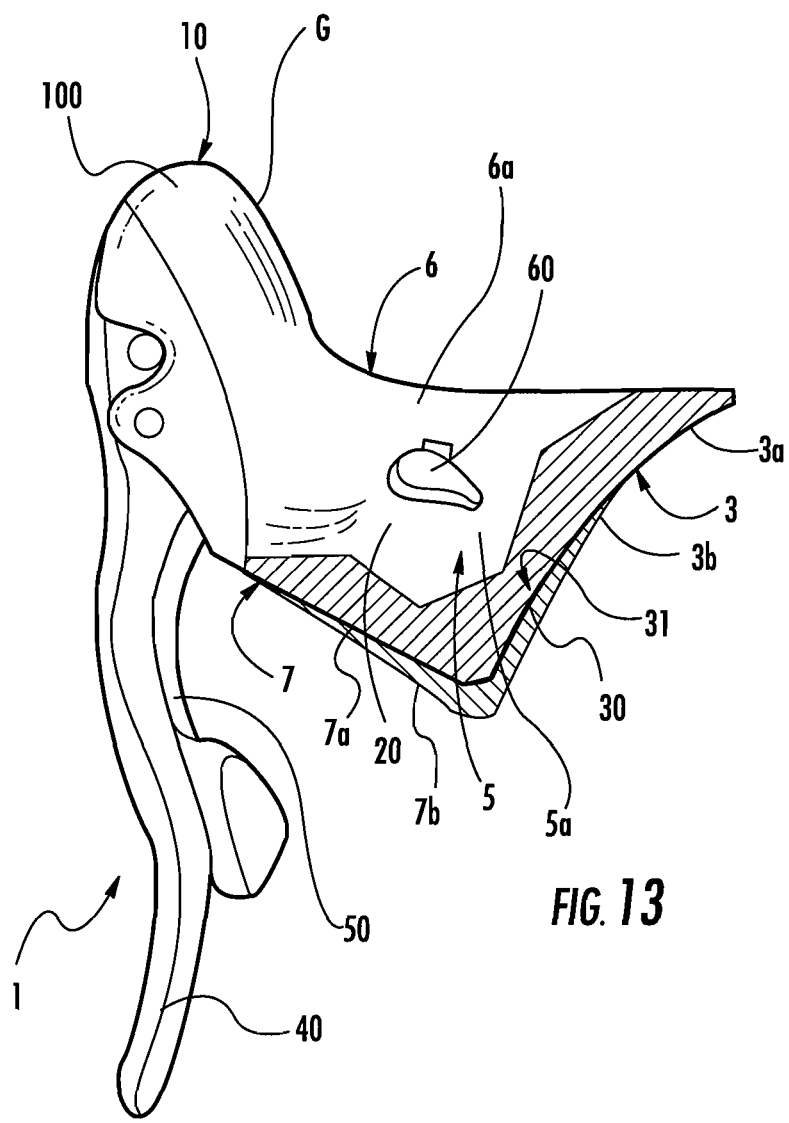

FIG. 13 illustrates a further embodiment of the control device 1. Such an embodiment differs from that of FIGS. 2 and 2a only in that the second body 30 is associated with the first body 20 both at part of the lower wall 7 (as in the embodiment of FIG. 2) and at part of the rear wall 3 of the control device 1 (as in the embodiment of FIG. 10) and substantially extends both on the lower wall 7 and on the rear surface 3. The second body 30 can be positioned with respect to the first body 20 so as to define a single predetermined relative position, but as for embodiments described previously it is possible to provide an adjustment member of the relative position of the second body 30 with respect to the first body 20. Such a coupling configuration allows the advantages discussed with reference to the embodiments illustrated in FIGS. 2 and 10 to be achieved.

In the embodiment of FIG. 13, the rear wall 3 of the control device 1 is in this case defined in part by the rear surface 3a of the first body 20 and in part by the rear surface 3b of the second body 30. The outer side wall 4, the inner side wall 5, and the upper transversal wall 6 of the control device 1 are defined by an outer side surface 4a, an inner side surface 5a, and an upper transversal surface 6a, respectively, of the first body 20, whereas the lower transversal wall 7 of the device 1 is defined by a lower transversal surface 7b of the second body 30.

An alternative embodiment of the control device 1 illustrated in FIG. 13 can be provided, wherein the rear wall 3 of the control device 1 is integrally defined by the rear surface 3b of the second body 30 and the lower transversal wall 7 of the control device 1 is defined in part by the lower transversal surface 7a of the first body 20 and in part by the lower transversal surface 7b of the second body 30. In this case, the second body 30 is shorter in length and height than the first body 20 at the respective lower transversal surfaces 7a and 7b and the respective rear surfaces 3a and 3b.

Figure 14:
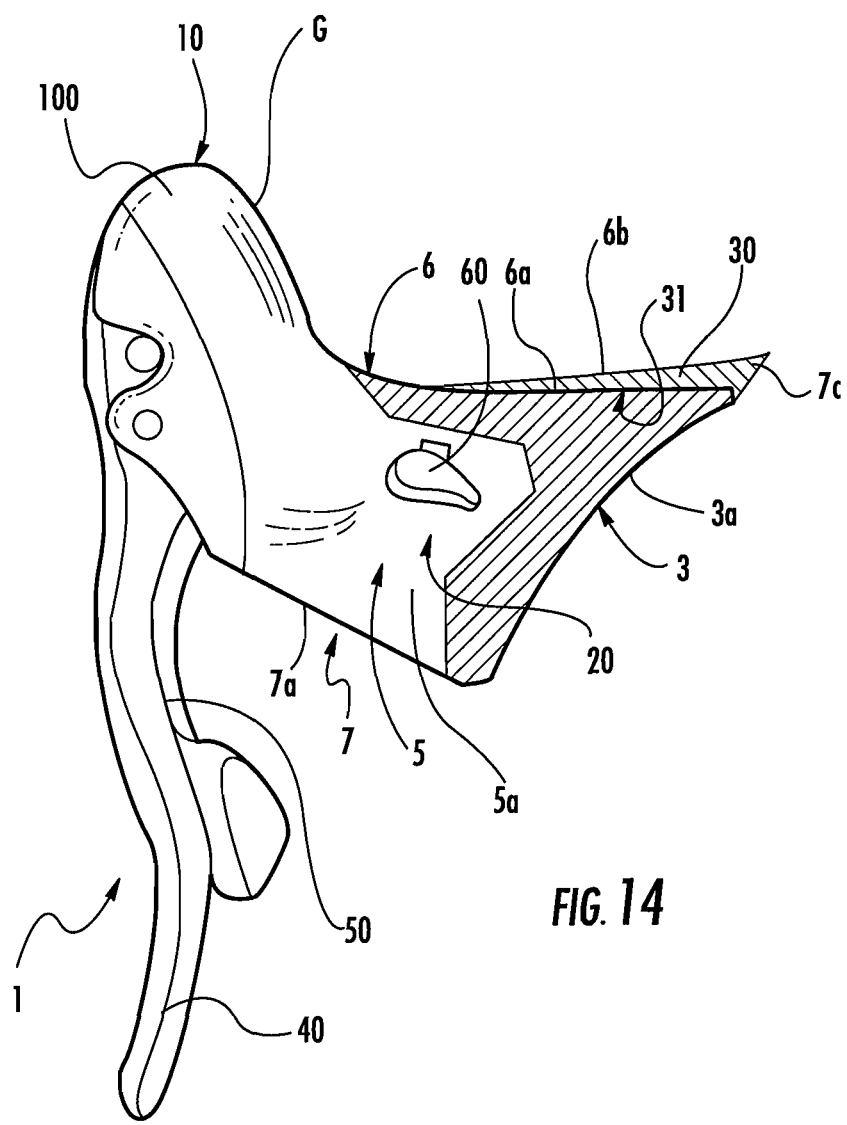

FIG. 14 illustrates a further embodiment of the control device 1. Such an embodiment differs from that of FIGS. 2 and 2a only in that the second body 30 is associated with the first body 20 at the upper surface 6a of the latter and extends over a part of the upper surface 6a, with the thickest part of the second body 30 arranged at the rear part of the upper surface 6a of the first body 20. In FIG. 14, elements corresponding to those described above with reference to the embodiment illustrated in FIGS. 2 and 2a are indicated with the same reference numeral.

The second body 30 can be positioned with respect to the first body 20 so as to define a single predetermined relative position. Between the surface 6a of the first body 20 and the coupling surface 31 of the second body 30 an adhesive substance can be provided as in, for example, a glue.

In the embodiment of FIG. 14, the upper wall 6 of the control device 1 is defined in part by the upper surface 6a of the first body 20 and in part by the upper surface 6b of the second body 30, whereas the outer side wall 4, the inner side wall 5, the rear wall 3 and the lower transversal wall 7 of the control device 1 are, on the other hand, defined by an outer side surface 4a, an inner side surface 5a, a rear surface 3a, and a lower transversal surface 7a, respectively, of the first body 20.

The second body 30 can also comprise a portion 7c (shown in FIG. 14) which, projecting rearwardly with respect to the first body 20, allows the levers 40 and 50 to be brought closer to the handlebar.

An alternative embodiment of the control device 1 illustrated in FIG. 14 can be provided, wherein the upper wall 6 of the control device 1 is integrally defined by the upper surface 6b of the second body 30. In this case, the second body 30 has a length substantially equal to that of the first body 20 at the respective upper surfaces 6a and 6b.

The use of a coupling configuration like the one illustrated in FIG. 14 allows the grip surface of the control device to be increased. This situation is favorable for cyclists with large hands.

Figure 15:
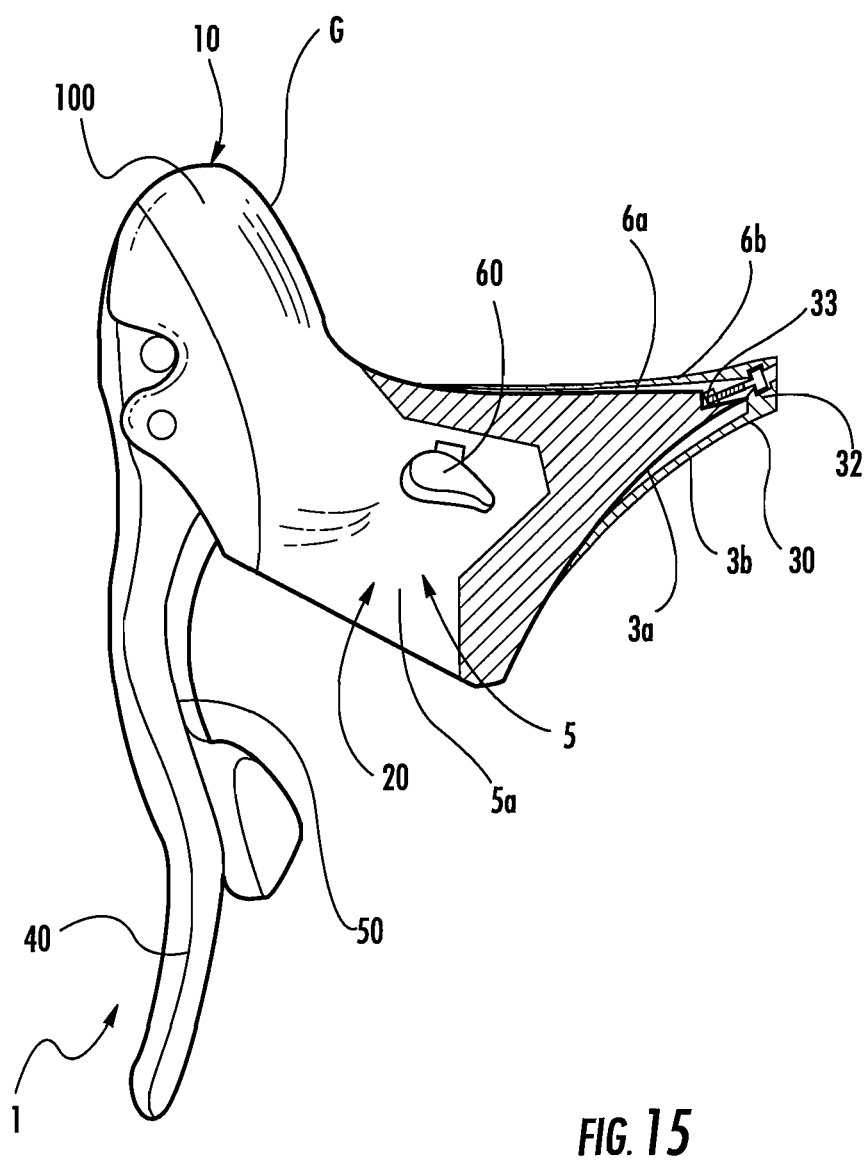

FIG. 15 illustrates a further embodiment of the control device 1. Such an embodiment differs from that of FIGS. 2 and 2a only in that the second body 30 is associated with the first body 20 both at part of the upper wall 6 (as in the embodiment of FIG. 14) and at part of the rear wall 3 of the latter (as in the embodiment of FIG. 11) and substantially extends both on the upper wall 6 and on the rear wall 3. The second body 30 can be adjustably positioned with respect to the first body 20. For this purpose, an adjustment member of the relative position between the second body 30 and the first body 20 is provided at the crossing point of the rear wall 3 with the upper wall 6 of the device 1, so as to adjust the position of the second body 30 with respect to the first body 20 as desired. In particular, such an adjustment member comprises an adjustment screw 32 associated, at one end thereof, with the second body 30 and, at the opposite end thereof, with a female screw 33 fixedly connected to the first body 20. Alternatively, the screw 32 can be associated with the first body 20 and the female screw 33 can be fixedly connected to the second body 30.

As for the other embodiments described above, it is nevertheless possible to associate the second body 30 with the first body 20 so as to define a single predetermined relative position. Such a coupling configuration allows the advantages discussed above with reference to the embodiments illustrated in FIGS. 2 and 10 or 11 to be achieved.

In the embodiment of FIG. 15, the rear wall 3 of the control device 1 is in this case defined in part by the rear surface 3a of the first body 20 and in part by the rear surface 3b of the second body 30 and the upper wall 6 of the device is in part defined by the upper surface 6a of the first body 20 and in part by the upper surface 6b of the second body 30. The outer side wall 4, the inner side wall 5, and the lower transversal wall 7 of the control device 1 are defined by an outer side surface 4a, an inner side surface 5a, and a lower transversal surface 7a, respectively, of the first body 20.

An alternative embodiment of the control device 1 illustrated in FIG. 15 can be provided wherein the rear wall 3 of the control device 1 is integrally defined by the rear surface 3b of the second body 30 and the upper transversal wall 6 of the control device 1 is integrally defined by the upper transversal surface 6b of the second body 30. In this case, the second body 30 has a length and height equal to those of the first body 20 at the respective upper transversal surfaces 6a and 6b and the respective rear surfaces 3a and 3b.

One skilled in the art shall recognize that it is possible to combine the various features of the embodiments described above to obtain further embodiments, all of which are in any case within the scope of protection as defined by the subsequent claims.

A kit of parts may be used to assemble a control device 1. The kit comprises a first body 20 adapted to be associated with a bicycle handlebar and at least two second bodies 30 adapted to be selectively associated with the first body 20, wherein the at least two second bodies 30 differ in at least one from shape and size. Such a kit is supplied to the cyclist to allow him to choose the second body 30 most suitable to adapt the control device 1 to the size of his hand.

What is claimed is:

1. A control device configured for attachment to a handlebar of a bicycle, the control device comprising:
   a first body that defines a grip portion of the control device and includes a front portion, a first rear surface configured to contact the handlebar when the control device is mounted on the handlebar, and a first upper transversal surface;
   a brake control lever; and
   a second body that is distinct from the first body and includes a second upper transversal surface, the second body is positioned above the first body and defines a second rear surface that is aligned with the first rear surface of the first body,
   wherein the first and second upper transversal surfaces combine to define an upper transversal wall of the control device and the first and second rear surfaces combine to define a rearmost face of the control device that is configured to contact the handlebar.

2. The device according to claim 1, wherein the second body is connected to the first body, and is configured and sized to vary a relative position of the first body to the handlebar when the control device is mounted on the handlebar.

3. The device according to claim 1, wherein the second body is connected to the first body at respective coupling surfaces having matching shapes.

4. The device according to claim 1, wherein the second body is positioned in a single predetermined position with respect to the first body.

5. The device according to claim 4, wherein the second body is connected to the first body through screws.

6. The device according to claim 4, wherein the second body is connected to the first body through glue.

7. The device according to claim 4, wherein the second body is connected to the first body through a snap coupling.

8. The device according to claim 1, further comprising at least one adjustment screw element for adjusting the position of the second body with respect to the first body.

9. The device according to claim 8, wherein the at least one adjustment screw element comprises a screw/female screw coupling operatively arranged between the first body and the second body.

10. The device according to claim 9, wherein one from the screw and the female screw is associated with one from the first body and second body and the other from the screw and the female screw is associated with the other from the first body and second body.

11. The control device according to claim 8, wherein the second body comprises a portion that projects rearwardly with respect to the first body.

12. The control device according to claim 8, wherein upon activation of the adjustment screw element, a grip surface of the control device and the distance of the brake lever from the handlebar are simultaneously adjusted.

13. The device according to claim 1, wherein the second body is removably connected to the first body.

14. The device according to claim 1, further comprising an outer coating sheath which covers the first body and second body.

15. The device according to claim 1, wherein the upper transversal wall of the control device is defined integrally by the upper transversal portion of the second body.

16. The device according to claim 1, wherein the second body is also associated with the first surface of the first body, so as to be operatively arranged between the first body and the handlebar when the first body is associated with the handlebar.

17. The device according to claim 16, wherein the control device comprises a rear wall defined in part by the first rear surface of the first body and in part by the second surface of the second body.

18. The device according to claim 16, wherein the control device comprises a rear wall defined integrally by the second rear surface of the second body.

19. The device according to claim 1, wherein the second body, when connected to the first body, extends at least partially over the first rear surface of the first body.

20. A bicycle comprising a control device according to claim 1.

21. The control device according to claim 1, wherein each of an outer side wall and an inner side part of the control device has a respective surface substantially parallel to a substantially vertical intermediate reference plane P that passes through the control device.

22. The control device according to claim 1, wherein an inner side wall of the control device has surface portions not parallel to a substantially vertical intermediate reference plane P that passes through the control device.

23. The control device of claim 1, wherein the second body is configured to change the position of the brake control lever relative to the handlebar by rotating the brake control lever with respect to the handlebar when the control device is mounted on the handlebar.

24. The control device of claim 23, wherein the second body mates with the first body and the handlebar.

25. The control device of claim 24, wherein the second body mates with the first body in a snap engagement.

26. The control device of claim 1, comprising at least one lever that controls at least one bicycle component and that is directly hinged to the front portion of the first body.

27. The control device of claim 1, wherein the second body is directly connected to a portion of the first upper transversal surface of the first body.

* * * * *